Jan. 15, 1929.

J. W. FOLEY 1,699,233

ROLLER BEARING

Filed March 14, 1927    2 Sheets-Sheet 1

Inventor:
John W. Foley
By [signature]
Atty

Jan. 15, 1929.  J. W. FOLEY  1,699,233

ROLLER BEARING

Filed March 14, 1927  2 Sheets-Sheet 2

Inventor:
John W. Foley.

Patented Jan. 15, 1929.

1,699,233

UNITED STATES PATENT OFFICE.

JOHN W. FOLEY, OF CHICAGO, ILLINOIS.

ROLLER BEARING.

Application filed March 14, 1927. Serial No. 175,032.

This invention relates to improvements in roller bearings, and one of the objects of the invention is to provide an improved bearing of this character having means for reducing to a minimum both radial and thrust friction between the parts.

Figure 1:
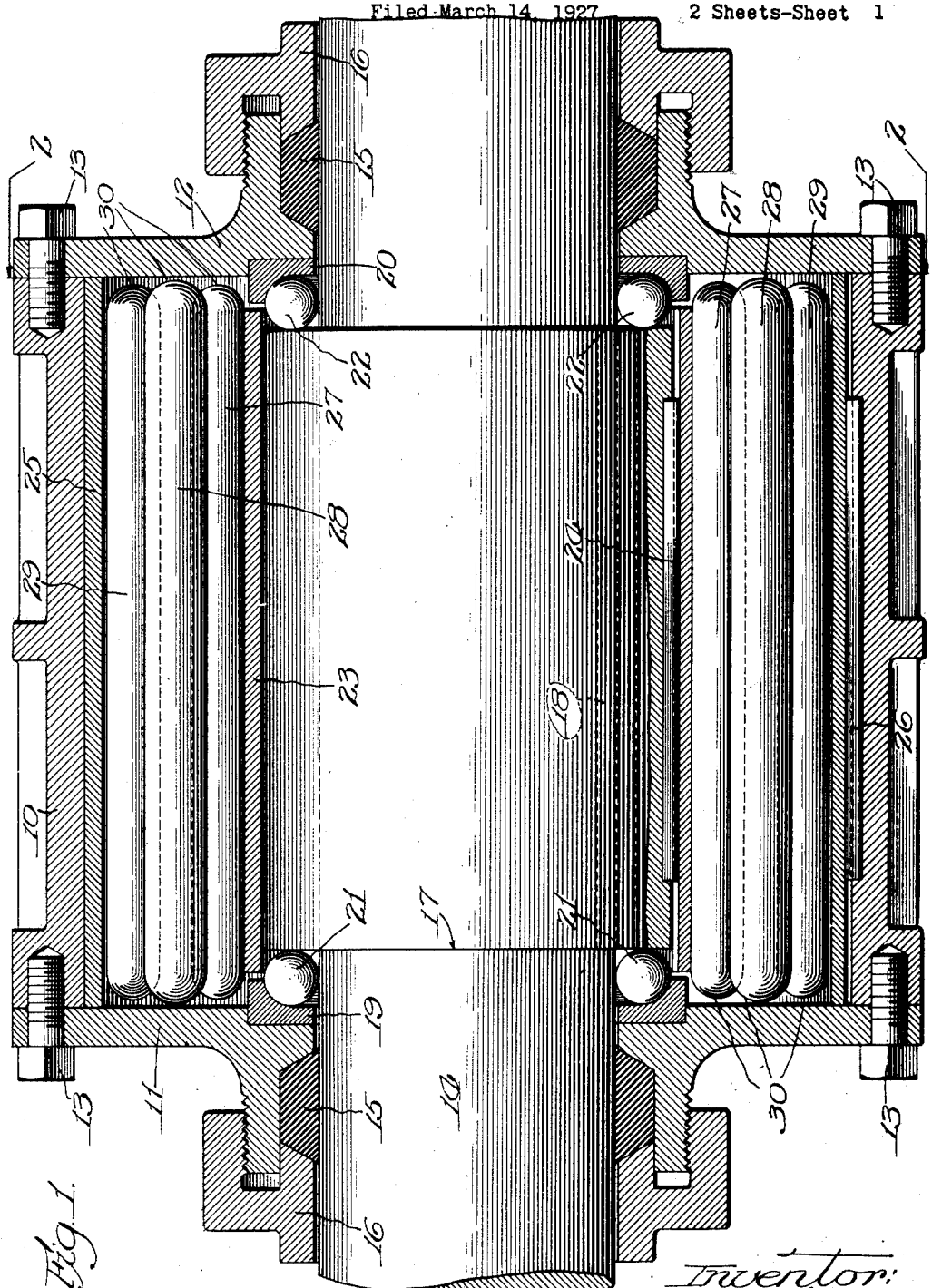

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a longitudinal sectional view of a bearing of this character constructed in accordance with the principles of this invention.

Figure 2:
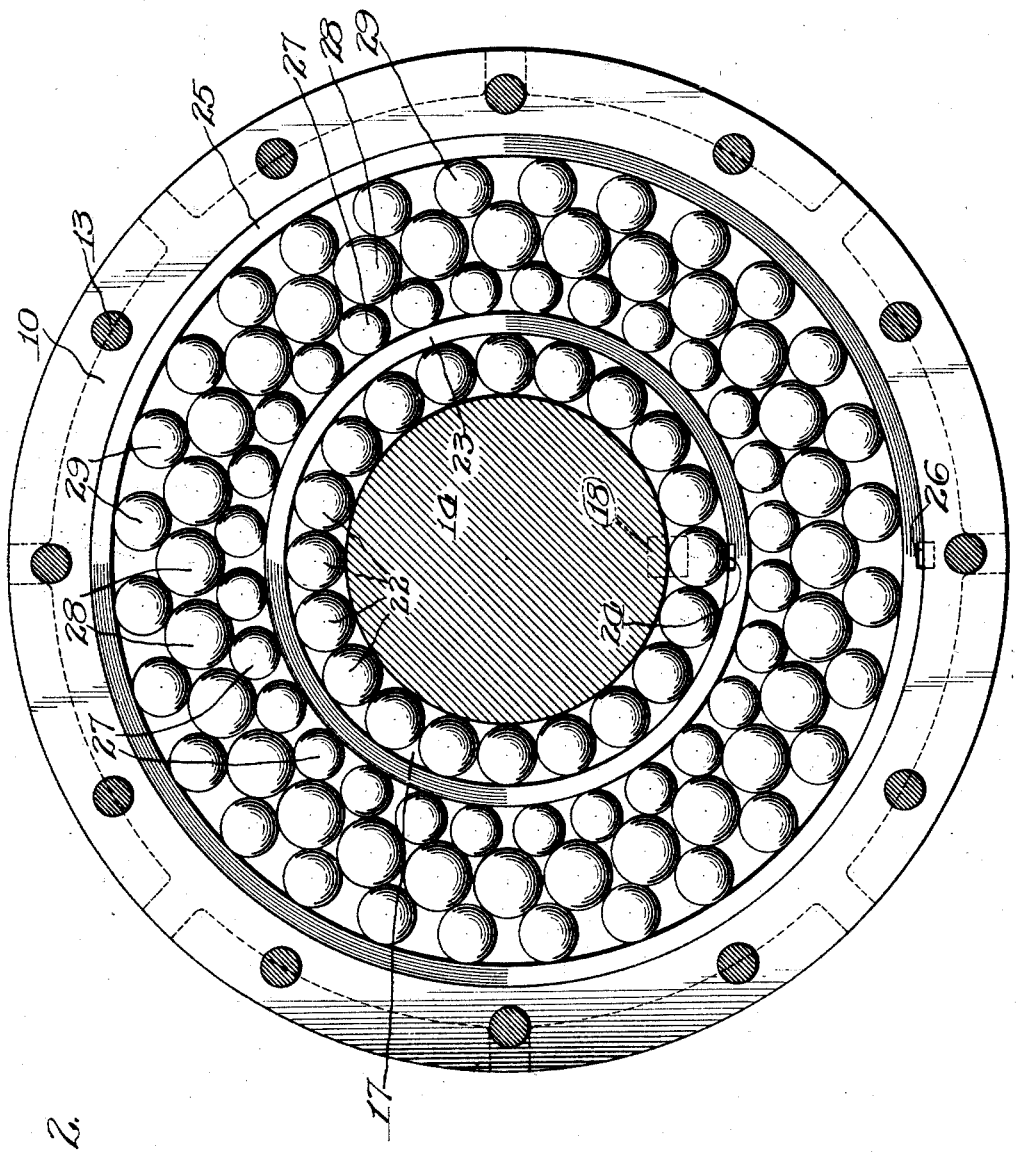

Figure 2 is a transverse sectional view taken on line 2—2, Figure 1.

Referring more particularly to the drawings the numeral 10 designates generally a casing having end members 11—12, which latter are secured in position by means of fastening bolts 13 so that the end members may be removed when desired.

Projecting into the casing and having bearings in the end walls is a shaft 14 having packing 15 encompassing the same and packing nuts 16, which latter respectively have threaded engagement with the end walls 11 and 12 and operate upon the packing 15 for producing a tight joint.

Encompassing the shaft 14 is a sleeve 17 which is secured thereto for rotation therewith in any suitable manner, such as by means of a fastening key or device 18.

The sleeve 17 is of a diameter considerably greater than the external diameter of the shaft and terminates short of the end walls 11 and 12 of the casing.

Bearing members 19—20 are arranged within the casing adjacent the end walls and balls 21—22 are arranged between the bearing members 19—20 and the respective ends of the sleeve 17 to provide end thrust bearings.

Encompassing the sleeve 17 is a sleeve 23 which is secured thereto for rotation therewith in any suitable manner such as by means of a key or fastening device 24.

This sleeve 23 is preferably of a length considerably less than the length of the housing 10.

A sleeve 25 encompasses the sleeve 23 and is arranged concentric therewith, the sleeves 23 and 25 being spaced from each other for a considerable distance.

The sleeve 25 is preferably of a length substantially equal to the length of the casing and is secured to the casing and against rotation within the casing in any suitable manner, such as by means of a fastening device 26 in the form of a key or the like.

Interposed between the sleeves 23 and 25 are a plurality of series of elongated rollers 27—28—29, and the rollers of the respective series may be of any desired diameter with respect to each other and with respect to the rollers of the other series.

The series of rollers 27 have rolling contact with the periphery of the sleeve 23.

The series of rollers 28 have rolling contact with the series of rollers 27 and serve as spacer members for maintaining the rollers 27 out of rolling contact with each other.

The series of rollers 29 have rolling contact with the respective rollers of the series 28 and also with the inner periphery of the sleeve 25. The rollers 28 serve as spacer members for the rollers of the series 29.

In the preferred form of the invention the rollers of the series 27 are preferably of a diameter considerably less than the diameter of the series of rollers 28, and the diameters of the rollers of the series 29 are preferably less than the diameters of the rollers 28 but greater than the diameter of the rollers 27, so that when the concentrically arranged series of rollers are in position the axes of the rollers 28 will be arranged at angles of less than 90° with respect to the axes of the co-operating rollers 27—29, thereby avoiding impinging rolling friction of the rollers against the respective surfaces and against each other.

The rollers 27, 28 and 29 are preferably coextensive in length and the extremities thereof are rounded as at 30 so as to form end bearings for the rollers in the event that they should contact with the end members 11 and 12 of the casing.

With this improved construction it will be manifest that the rollers of the different series are independent with respect to the rollers of the other series and all of the rollers of each series are independent with respect to each other.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A roller bearing embodying spaced concentric sleeves, a plurality of concentrically arranged series of elongated rollers disposed between the sleeves, the rollers of each series being independent of each other, the outer series having rolling contact with the respective adjacent sleeves, the rollers of the intermediate series being of a larger diameter than the two outer series and having rolling contact with the respective adjacent rollers of both of the outermost series and operating to maintain the rollers of the last said series spaced and out of rolling contact with each other, a casing in which the bearing is arranged, means anchoring the outermost sleeve to the casing, a shaft projecting into the innermost sleeve, and means connecting the shaft and last recited sleeve for rotation together.

2. A roller bearing embodying spaced concentric sleeves, and a plurality of concentrically arranged series of elongated rollers disposed between the sleeves, the rollers of each series being independent of each other and each series being independent of the others, the outer series having rolling contact with the respective adjacent sleeves, the rollers of the intermediate series having rolling contact with the respective adjacent rollers of both of the outermost series and operating to maintain the rollers of the last said series spaced and out of rolling contact with each other, the diameter of the rollers of the respective series being uniform and the diameter of the rollers of each series being different from the diameter of the rollers of the other series.

3. A roller bearing embodying spaced concentric sleeves, and a plurality of concentrically arranged series of elongated rollers disposed between the sleeves, the rollers of each series being independent of each other, the outer series having rolling contact with the respective adjacent sleeves, the rollers of the intermediate series having rolling contact with the respective adjacent rollers of both of the outermost series and operating to maintain the rollers of the last said series spaced and out of rolling contact with each other, all of the rollers being of substantially the same length, the extremities of all of the rollers being rounded to form end bearings.

4. A roller bearing embodying spaced concentric sleeves, a plurality of concentrically arranged series of elongated rollers disposed between the sleeves, the rollers of each series being independent of each other, the outer series having rolling contact with the respective adjacent sleeves, the rollers of the intermediate series having rolling contact with the respective adjacent rollers of both of the outermost series and operating to maintain the rollers of the last said series spaced and out of rolling contact with each other, and a casing in which the bearing is arranged, all of said rollers being of a length substantially equal to the length of the casing.

5. A roller bearing embodying spaced concentric sleeves, and a plurality of concentrically arranged series of elongated rollers disposed between the sleeves, the rollers of each series being independent of each other, the outer series having rolling contact with the respective adjacent sleeves, the rollers of the intermediate series having rolling contact with the respective adjacent rollers of both of the outermost series and operating to maintain the rollers of the last said series spaced and out of rolling contact with each other, the axes of adjacent rollers of the intermediate series of rollers being disposed at angles of less than ninety degrees with respect to the axes of the rollers of the outer and innermost series which are arranged between said pair.

In testimony whereof I have signed my name to this specification, on this 11th day of March, A. D. 1927.

JOHN W. FOLEY.